F. MÜLLER.
MACHINE FOR AND METHOD OF MILLING BLANKS FOR CUTTERS.
APPLICATION FILED FEB. 1, 1919. RENEWED JAN. 31, 1920.

1,376,155.

Patented Apr. 26, 1921.
9 SHEETS—SHEET 1.

INVENTOR
Friederich Müller
BY S. Jay Teller
ATTORNEY

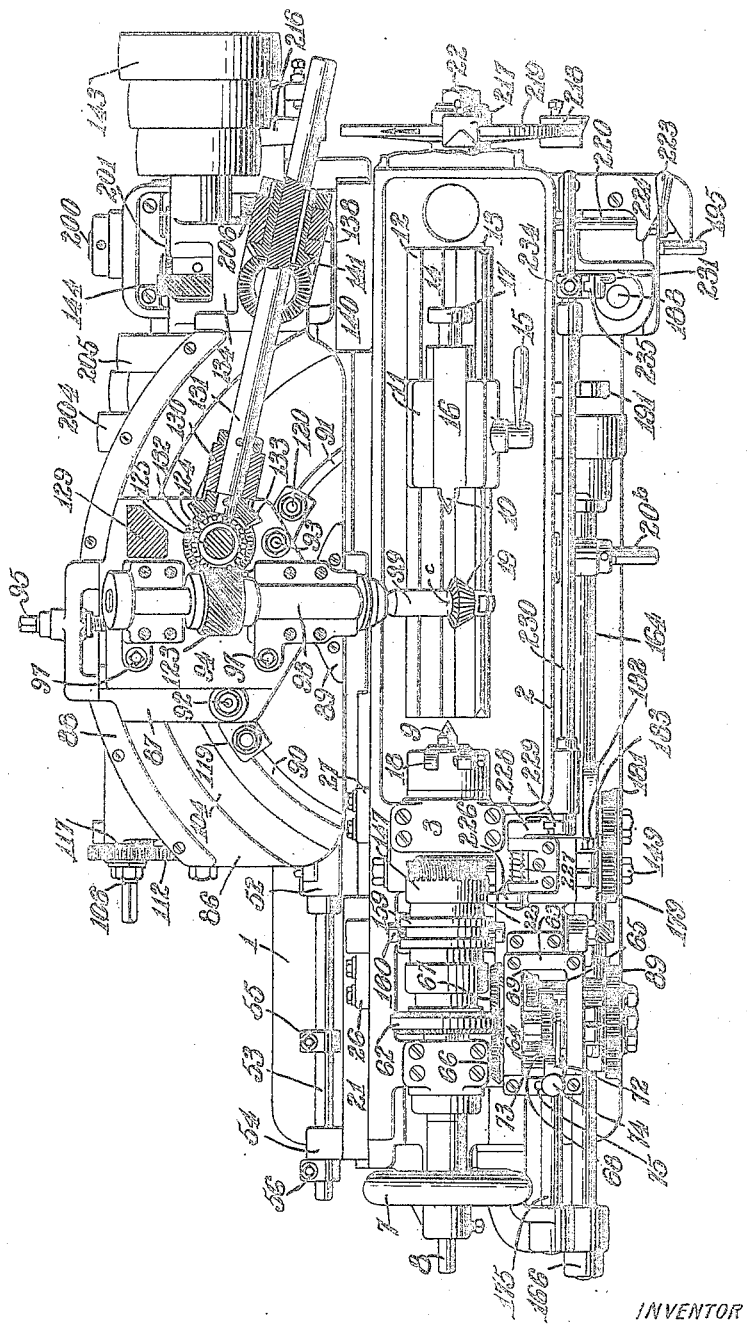

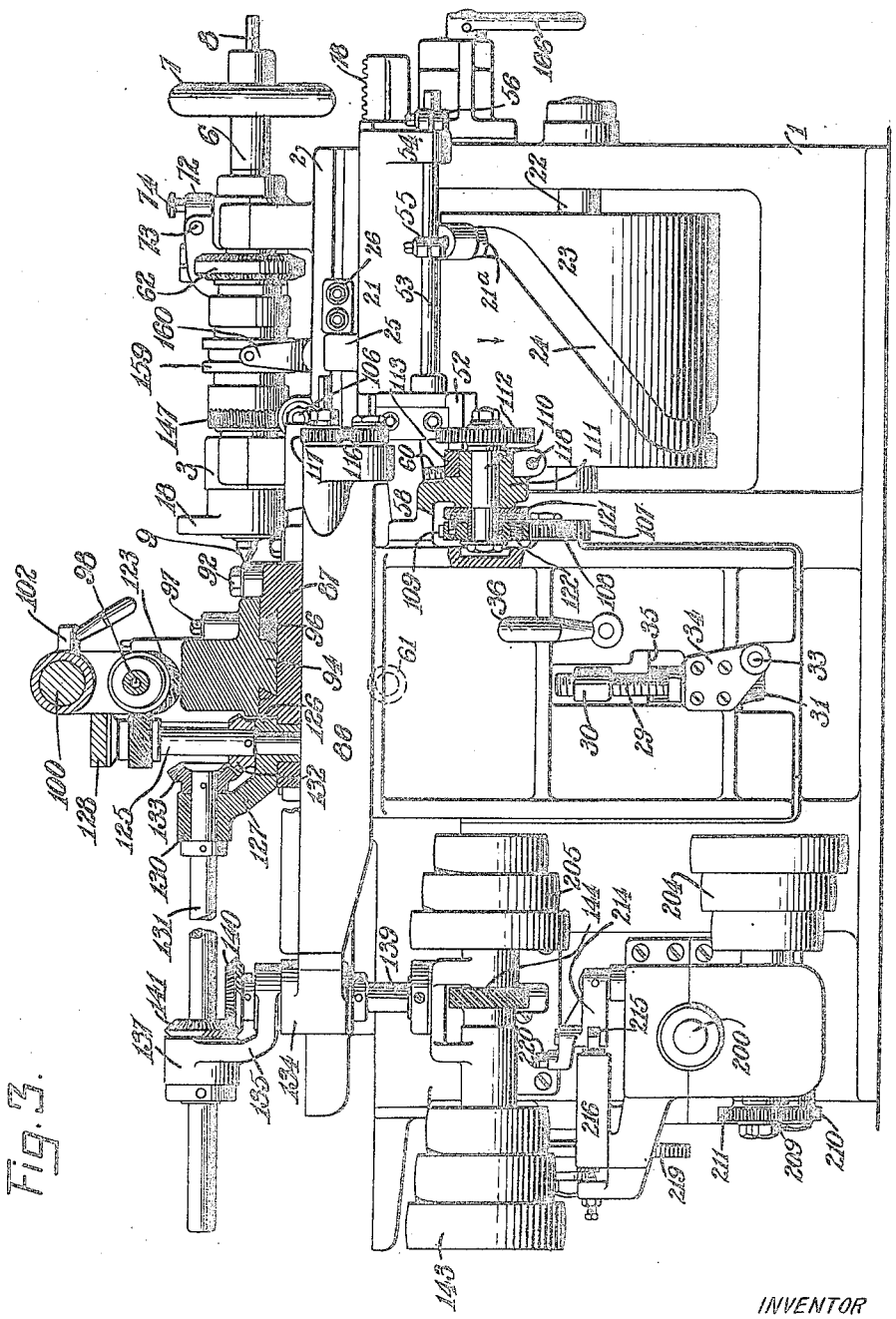

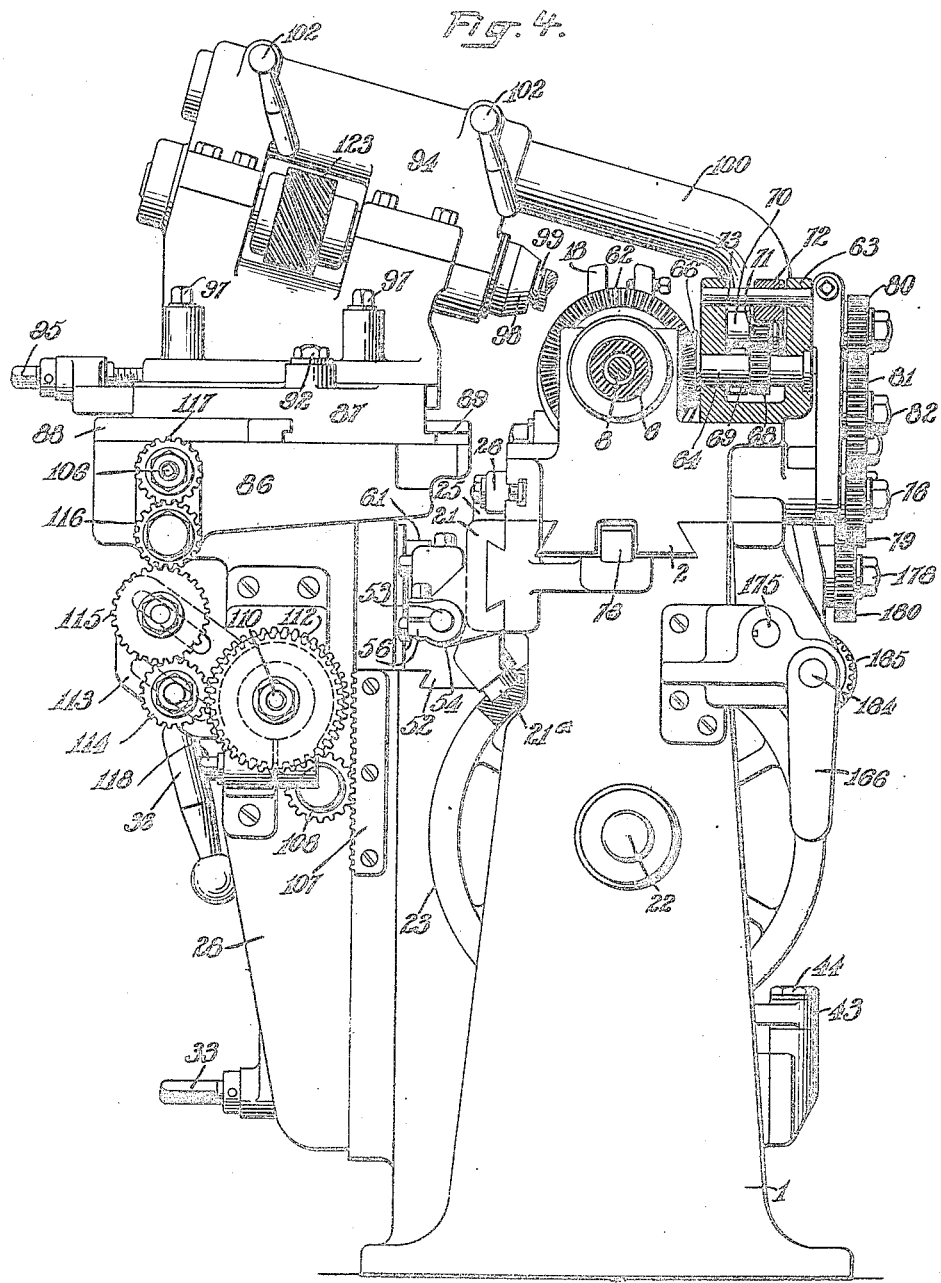

F. MÜLLER.
MACHINE FOR AND METHOD OF MILLING BLANKS FOR CUTTERS.
APPLICATION FILED FEB. 1, 1919. RENEWED JAN. 31, 1920.
1,376,155.
Patented Apr. 26, 1921.
9 SHEETS—SHEET 5.
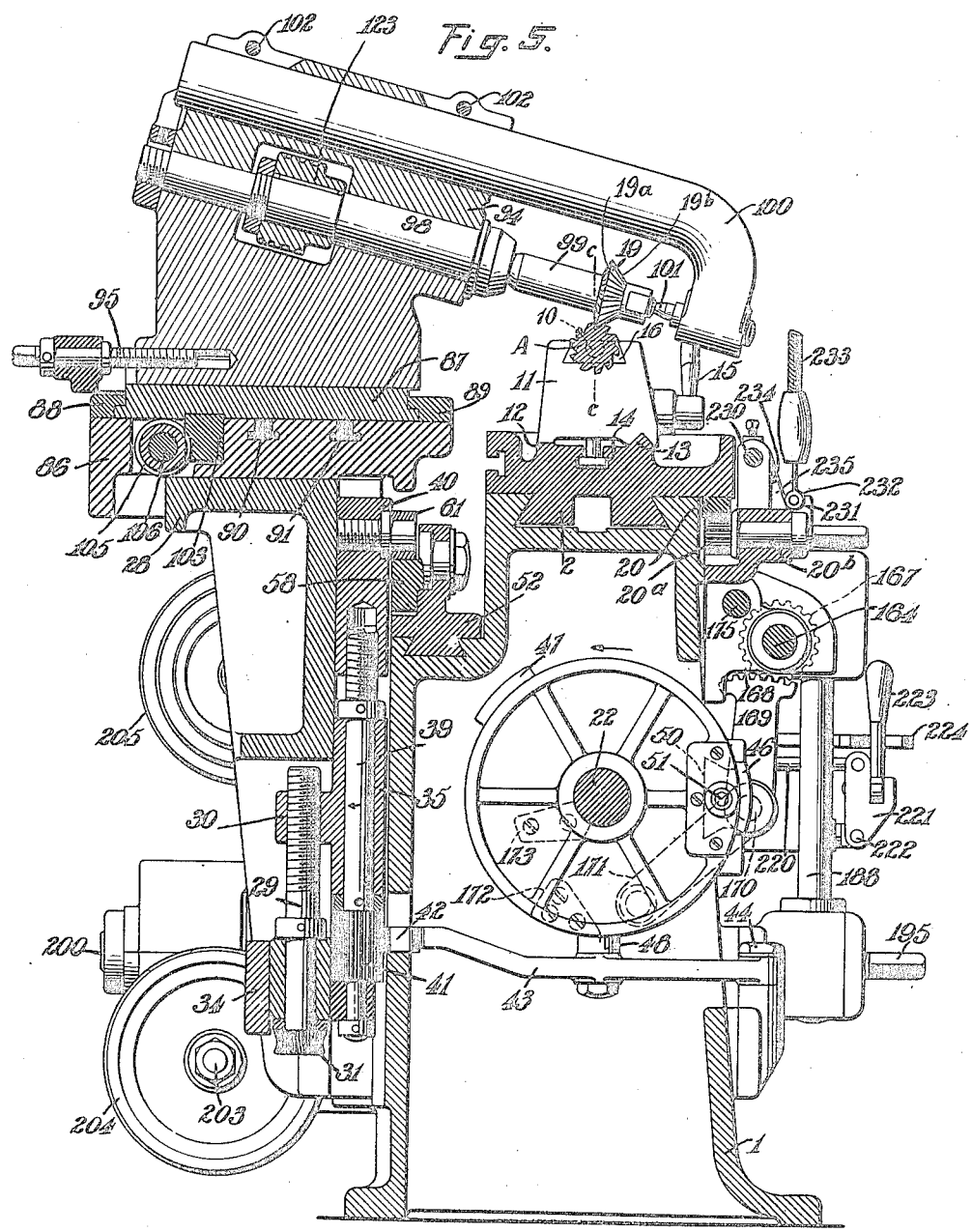
INVENTOR
Friederich Müller
BY S. Jay Teller
ATTORNEY

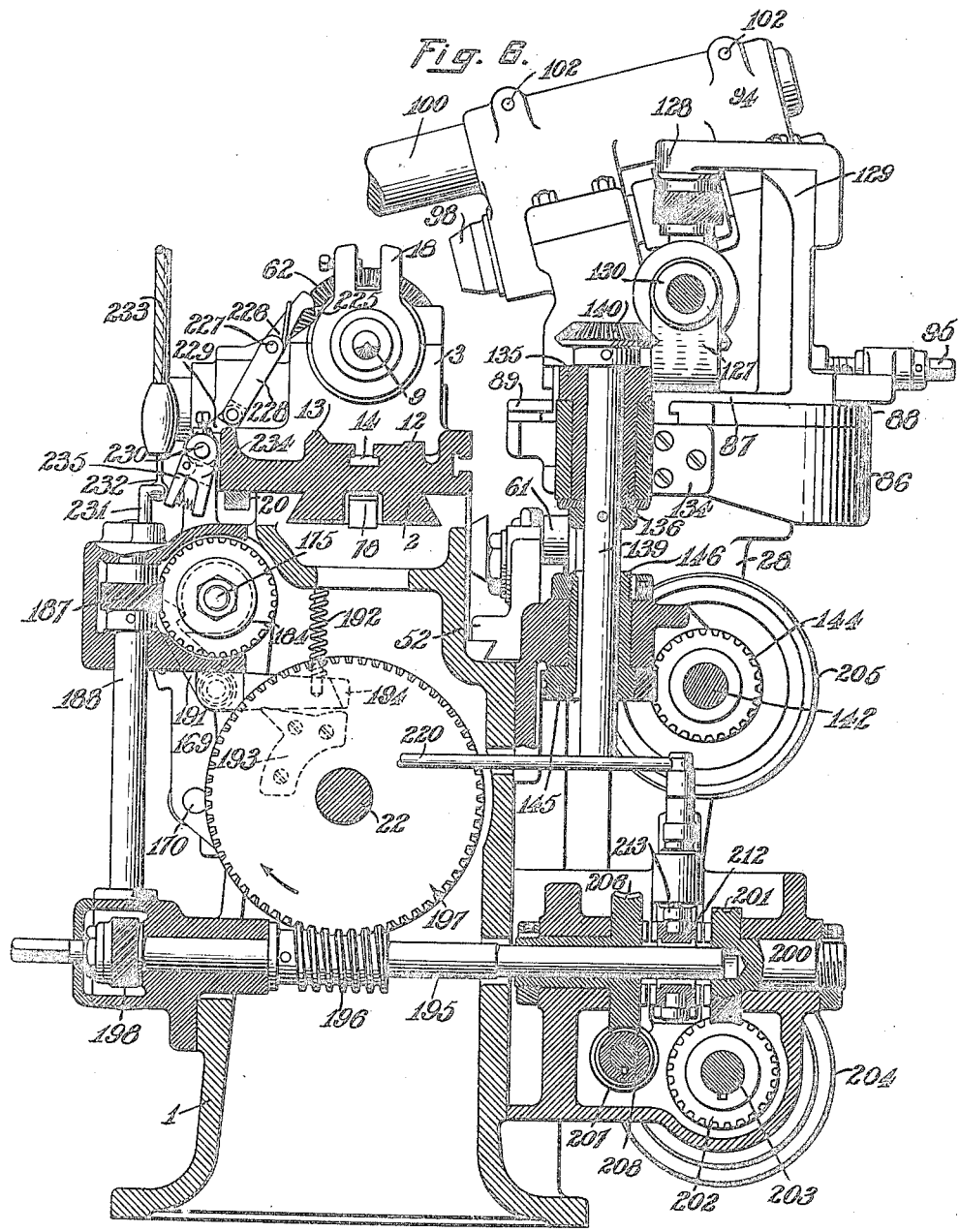

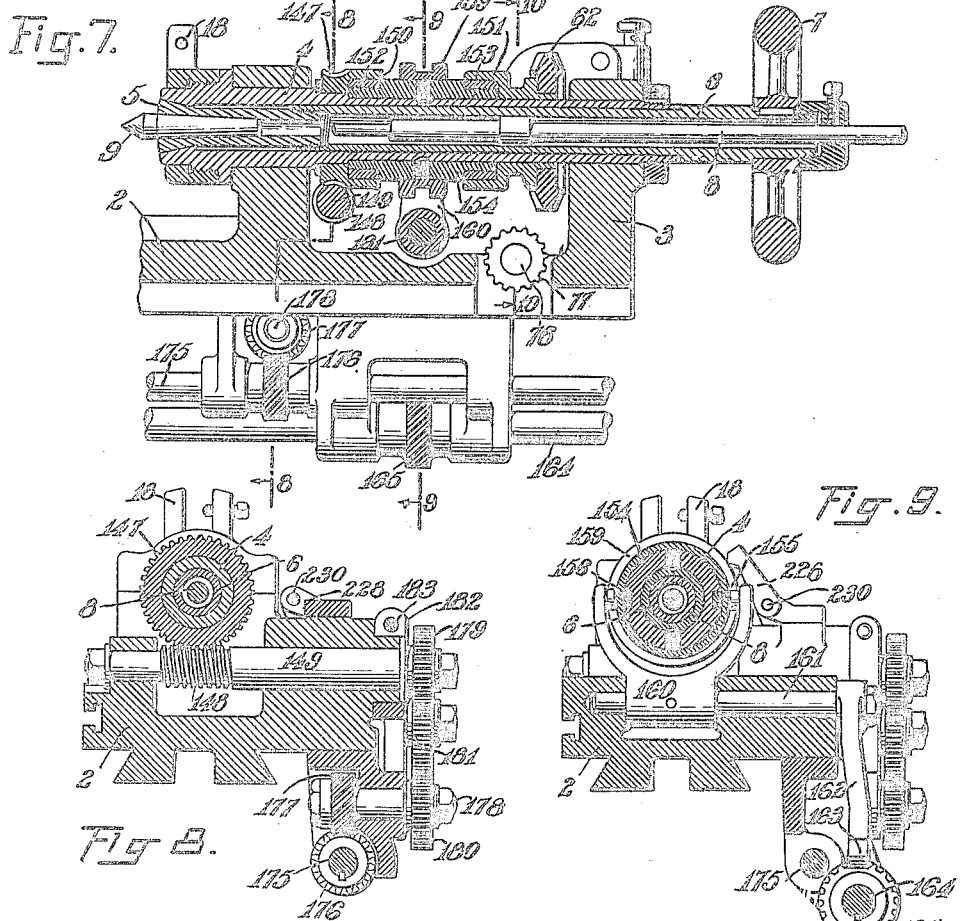
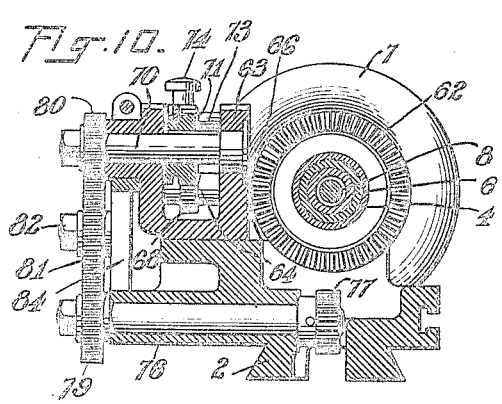
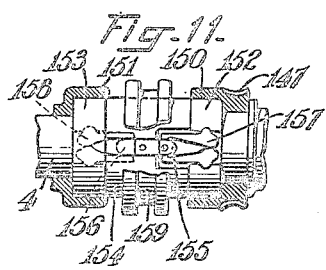

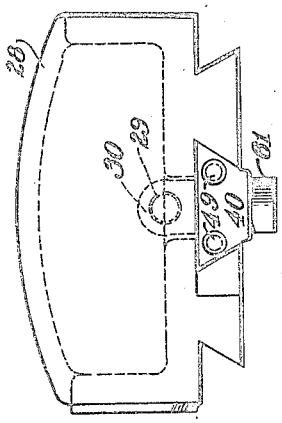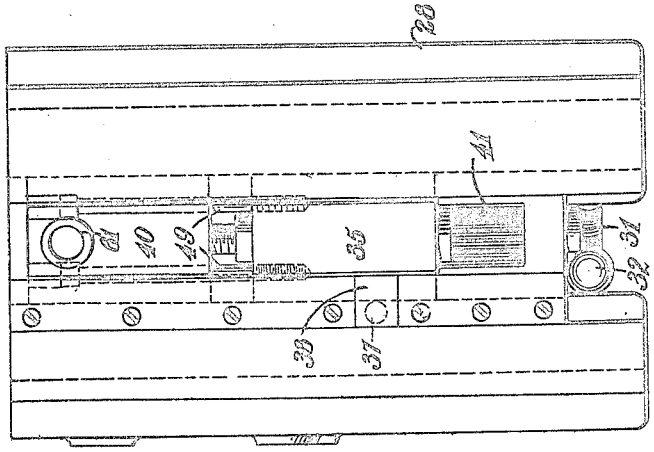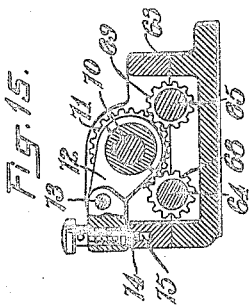

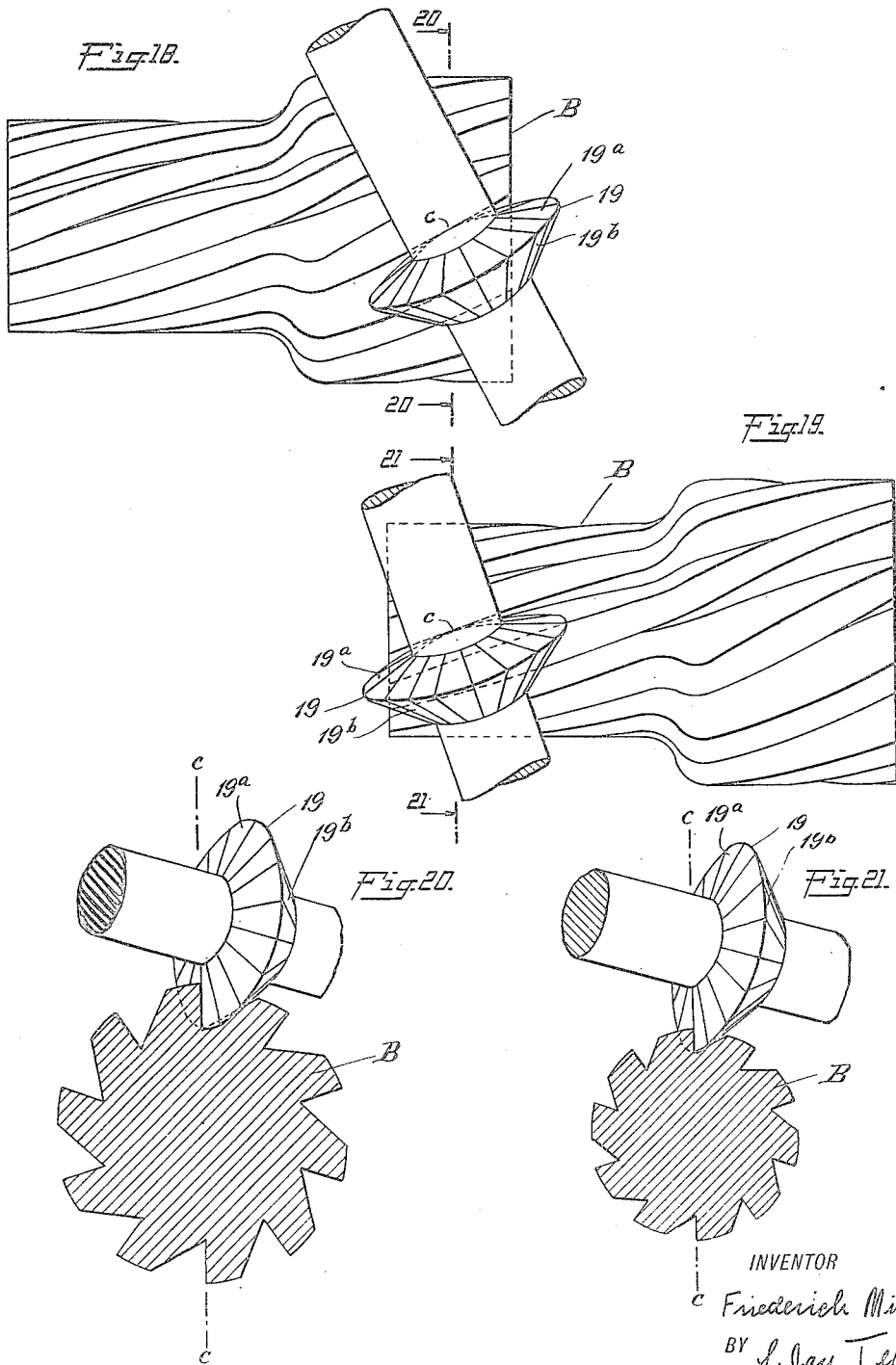

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR AND METHOD OF MILLING BLANKS FOR CUTTERS.

1,376,155. Specification of Letters Patent. Patented Apr. 26, 1921.

Application filed February 1, 1919, Serial No. 274,528. Renewed January 31, 1920. Serial No. 355,409.

*To all whom it may concern:*

Be it known that I, FRIEDERICH MÜLLER, a citizen of the United States, residing at Hartford, in the county of Hartford and State of Connecticut, have invented certain new and useful Improvements in Machines for and Methods of Milling Blanks for Cutters, of which the following is a specification.

A machine embodying the invention is especially well adapted for the cutting of grooves in taps, reamers, milling cutters and other metal working tools. The machine can be used for the cutting either of straight grooves or of right or left-hand helical grooves of any desired angular pitch; the grooves can be cut in blanks which are cylindrical or which are uniformly tapered or which otherwise vary in diameter from end to end; and the blanks can be indexed, preferably automatically, so that any desired number of grooves can be cut in each. Such a machine is set forth in my co-pending application for machines for milling blanks for cutters, Serial No. 172,413, filed June 2nd, 1917.

The object of the present invention is to provide a machine of the type specified having the axis of the milling cutter positioned at an acute angle to the lines of relative adjustment between the cutter and the work. This arrangement makes it possible for the depth of cut to be more easily changed, as will presently be fully explained; and it also makes it possible for the relative angular position between the cutter and the work to be adjusted with respect to the axis at the aforesaid acute angle. Another object of the invention is to provide an improved method of milling blanks with helical teeth and grooves.

In the accompanying drawings I have shown the embodiment of the invention which I now deem preferable, this being in the main similar to that presented in my aforesaid application, but it will be understood that the drawings are intended to be merely illustrative and are not intended to define or limit the scope of the invention, the accompanying claims being relied upon for that purpose.

Of the drawings:

Fig. 2 is a plan view with certain parts shown in section.

Fig. 3 is a rear view with certain parts shown in section.

Fig. 4 is a view taken from the left-hand end with certain parts shown in section.

Fig. 5 is a central transverse vertical sectional view taken from the left.

Fig. 6 is a transverse vertical sectional view taken from the right.

Fig. 7 is a fragmentary longitudinal view taken from the rear and showing the headstock and associated parts partly in elevation and partly in vertical section.

Fig. 8 is a transverse sectional view taken along the line 8—8 of Fig. 7.

Fig. 9 is a transverse sectional view taken along the line 9—9 of Fig. 7.

Fig. 10 is a transverse sectional view taken along the line 10—10 of Fig. 7.

Fig. 11 is a fragmentary detail view showing the clutch mechanism for actuating the spindle.

Fig. 12 is a view showing the cutter-supporting bracket and associated parts detached from the machine.

Fig. 13 is a plan view of the parts shown in Fig. 12.

Fig. 14 is a detail view of a part of the mechanism for controlling the cutter.

Fig. 15 is a detail view showing a part of the mechanism for imparting rotative movement to the blank.

Fig. 16 is a detail view showing a part of the indexing mechanism.

Fig. 17 is a sectional view taken along the line 17—17 of Fig. 16.

Figs. 18 and 19 are diagrammatic plan views of a blank and cutter, these views illustrating the method.

Fig. 20 is a sectional view taken along the line 20—20 of Fig. 18.

Fig. 21 is a sectional view taken along the line 21—21 of Fig. 19.

Figure 1:
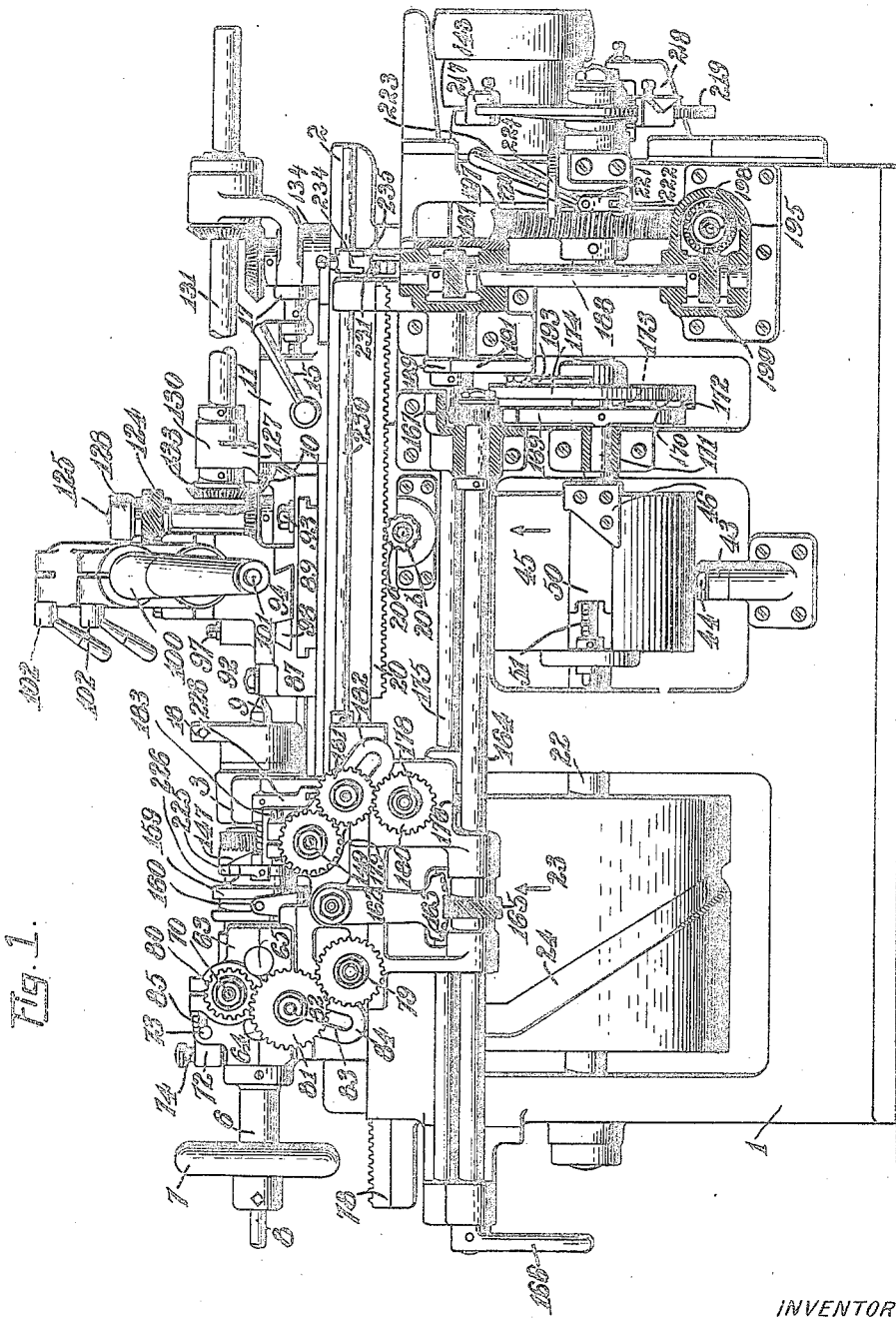
Figure 1 is a front view with certain parts shown in section.

Referring to the drawings, 1 represents the main frame casting upon which the several parts of the mechanism are mounted. Slidably mounted on ways extending longitudinally of the frame 1 is a work-carrying table 2. Supported on the table 2 are means for holding and manipulating the work, which is usually a blank to be grooved. This means comprises a headstock 3 having a rotatable spindle 4. The spindle 4 preferably carries a collet 5 which is controlled by a sleeve 6, and a hand wheel 7. The blank to be grooved may be mounted directly in the collet 5, and, in order to provide a stop for the blank when so mounted, a rod 8 is adjustably mounted in the sleeve 6.

Under most circumstances, particularly when relatively long blanks are to be grooved, it is desirable to mount the blanks between centers instead of directly in the collet 5 as set forth above. When centers are to be used, one of them is mounted in the collet 5, as shown at 9, and the other of them, as shown at 10, is mounted in a suitable tailstock 11. The tailstock is movable along ways 12 and 13 extending longitudinally of the table 2 and can be locked in place by means of a T-bolt which enters a longitudinal T-slot 14. The T-bolt can be tightened or loosened by means of the handle 15. The center 10 is carried by a slide 16 which is adjustable longitudinally of the tailstock by means of a screw carrying a hand wheel 17.

For turning a blank carried by the centers, the spindle 4 is provided with a suitable driver 18 which is adapted to be connected with the blank by means of a dog or other usual device.

Suitably mounted above the centers 9 and 10 is a milling cutter 19 adapted to engage a blank held by the centers. The means for holding, adjusting and rotating the cutter will be fully set forth hereinafter. It will be observed that the top plane of the tailstock is only slightly above the axis of the centers, thus permitting the cutter 19 to have free access to the blank from the top.

For moving the table to effect preliminary adjustments, there is preferably provided a rack 20 which meshes with a pinion 20$^a$ on a short horizontal shaft 20$^b$. This shaft 20$^b$ is suitably mounted in a bearing carried by the main frame and is squared at its end to receive a wrench or crank. By turning the shaft the table may be preliminarily moved as desired.

Formed at the back of the main frame 1 are longitudinal guideways upon which is movably mounted a slide 21. This slide has a depending projection which carries a roller 21$^a$. Rotatably mounted in bearings in the main frame is a longitudinal shaft 22 which carries a cam drum 23 provided with a cam groove 24 into which the roller 21$^a$ enters. The drum 23 is rotated in the direction indicated by the arrows in Figs. 1 and 3 and the groove 24 therein has one section which is relatively sharply inclined in one direction, as shown in Fig. 3, and another section which is less sharply inclined in the other direction, as shown in Fig. 1. Between these two sections of the groove is a section which is perpendicular to the axis of the drum, this section engaging the roller immediately after the sharply inclined section. The result is that the slide 21 is moved backward relatively rapidly (toward the right as shown in Fig. 3) and is moved forward relatively slowly (toward the left as viewed in Fig. 3). At the end of the backward movement the slide is maintained stationary for a brief period.

The slide 21 carries an upward projecting lug 25 which is adapted to engage dogs 26 and 27 which are adjustably secured to the rear side of the table 2. By means of these dogs the table is made to reciprocate when the slide 21 is reciprocated, and the limits of the reciprocating movement can be changed by changing the positions of the dogs. The length of the stroke can be changed by bringing the dogs closer together or farther apart, and the limits of reciprocation can be moved toward the right or toward the left without changing the length of stroke by properly moving the dogs and keeping them the same distance apart.

When the blank has been mounted on the centers 9 and 10 in the usual way, the movement of the table in the way described serves to move the blank longitudinally past the cutter 19 which cuts a groove in the blank, the form of the groove corresponding with the form of the cutter.

The cutter 19 is supported on a bracket 28 by means of various intermediate frame parts which will presently be described. The bracket 28 engages suitable guides on the main frame 1 and is vertically movable along these guides. In order to vertically adjust the cutter 19 to bring it into the desired relationship to the blank, the bracket 28 is vertically adjustable by means of a screw 29. The lower part of the screw is rotatably mounted in a bearing in the lower part of the bracket and is held against longitudinal movement with respect thereto. The upper threaded part of the screw extends through a threaded lug 30 which is supported on the main frame in the manner to be presently described. At the lower end of the screw 29 is a worm wheel 31 which meshes with a worm 32. This worm is mounted on a short horizontal shaft 33 which is rotatably mounted in a bearing member 34 carried by the bracket 28. The shaft 33 is provided with a squared end by means of which it can be turned to turn the screw 29 and adjust the bracket 28 and the cutter 19.

The lug 30 is formed on a block 35 which is relatively movable vertically in guideways formed in the bracket 28. After the adjustment of the bracket by means of the screw 29 as aforesaid, the bracket and the block can be locked together in adjusted position by means of the handle 36 carried by a screw 37 threaded into a gib 38.

In normal operation the cutter acts on the blank during movement of the carriage in the forward direction; that is, during movement toward the right as viewed in Figs. 1 and 2. During movement of the table in the backward direction it is necessary to separate the cutter and the blank in order that the cutter may not mar the blank in any way. I effect this separation by lifting the cutter at the end of the forward movement of the table and maintaining it in elevated position during the backward movement. For this purpose the following mechanism is provided: Rotatably mounted in a suitable vertical aperture in the block 35 is a shaft or screw 39 which is held against any considerable longitudinal movement with respect to the said block. The upper end of the shaft 39 is threaded and enters a threaded aperture in a block 40 which is supported on the main frame 1. It will be seen that by turning the shaft 39 it is possible to raise or lower the block 35 together with the bracket 28 and the parts carried thereby including the cutter 19. The bracket 28 moves upward or downward in parallelism.

The shaft 39 is provided at or near its lower end with a relatively wide spur gear wheel 41 which meshes with a segmental gear 42 formed at the end of a lever 43. This lever is vertically pivoted at 44 to the main frame casting 1 near the front thereof. A cam drum 45 is mounted on the aforesaid cam shaft 22 and is provided with two oppositely inclined cam members 46 and 47. Carried by the lever 43 near the center thereof is a roller 48 adapted to be engaged by the said cam members 46 and 47. The cam member 46 is so positioned that it engages the roller 48 when the cam 23 has moved the table to its extreme forward position. The cam member 46 is so shaped that it moves the lever 43 toward the left, as viewed in Fig. 1, thus turning the shaft 39 in the clockwise direction, as indicated by the arrow in Fig. 5. By virtue of this rotative movement of the shaft 39, the upper threaded end thereof draws the shaft upward, the shaft carrying with it the bracket 28 and the parts carried thereby including the cutter 19. The bracket 28 and associated parts are maintained in this upper position until the beginning of the next forward movement of the table. Then the cam 47 engages the roller 48, thus moving the lever 43 toward the right and rotating the shaft 39 in the counter-clockwise direction. The threaded end of the shaft causes the bracket 28 to be lowered, thus moving the cutter 19 downward to its normal cutting position where it remains during the entire forward movement of the table.

It is important that the cutter 19 shall always assume the same normal cutting position, and in order that this position may not be entirely dependent upon the exact amount of rotation of the shaft 39, I preferably provide a supplemental limiting means as illustrated in Fig. 12. Two vertical bolts 49 are threaded into the upper part of the block 35 and extend through suitable apertures in the block 40. The upper ends of the bolts are provided with heads which are positioned in recesses in the block 40. When these heads engage the bottoms of their recesses, downward movement of the block 35 and of all of the parts connected therewith is definitely and positively limited. If it becomes necessary to change the limit of downward movement (to change the depth of the grooves), this is accomplished by means of the screw 29 in the manner already described.

In order that the extent of upward movement of the cutter may be changed, the cam member 46 is preferably adjustable longitudinally of the axis of the drum 45. The cam member is mounted on a slide 50 movable by means of a screw 51. By adjusting the cam member 46 in this way the extent of movement of the lever 43 toward the left can be changed, thus changing the amount of rotation of the shaft 39 and the amount of elevation of the cutter 19.

It is frequently desired to cut grooves in blanks which are non-cylindrical. Usually such non-cylindrical blanks are tapered, the diameter varying uniformly from end to end, but in some cases the diameter may vary in other ways, thus giving the blank an irregular longitudinal outline. For grooving such non-cylindrical blanks it is necessary to vary the distance between the cutter and the axis of the blank as the cutting operation proceeds. I accomplish this by moving the cutter upward or downward as required. This is effected by means of the following mechanism. Movably mounted in horizontal guideways formed at the rear of the main frame 1 is a slide 52. Projecting longitudinally from the slide 52 is a rod 53 which extends through an aperture in a lug 54 formed on the slide 21. Adjustably connected to the rod 53 and located on opposite sides of the lug 54 are two dogs 55 and 56. By properly adjusting these dogs 55 and 56 the slide 52 can be made to reciprocate in synchronism with the table 2. Usually the dogs will be so adjusted that the length of stroke of the slide 52 will be the same as that of the table 2, but obviously the length of stroke can be made different when required.

As shown most clearly in Fig. 14, the slide 52 carries guide members 57 and 58. As shown, the guide member 57 is rigidly secured to the slide with its top surface horizontal. The guide member 58 is in the form of a taper bar pivotally connected to the slide at 59 and adjustable about the axis of the pivot by means of the screw 60. The block 40 carries on its front face a roller 61 which is adapted to engage the top surfaces of the guide members 57 and 58. It will be recalled that the bracket 28 and the various parts associated therewith, including the cutter 19, are entirely dependent upon the block 40 for their support, and it will now be seen that the block 40 is supported entirely by the roller 61 which engages one of the guide members 57 and 58. When the slide 52, with the guide members, is moved in the way already described, the roller 61, together with the block 40 and all of the parts supported thereby, are moved upward or downward in accordance with the direction of movement of the slide. The extent of such upward or downward movement will be dependent upon the angle of inclination of the taper bar 58. Inasmuch as the slide 52 moves in synchronism with the table 2, the cutter 19 is moved away from or toward the axis of the blank simultaneously with the movement of the blank under the cutter. If the blank is a simple tapered one, the vertical movement of the cutter can be made to conform to the taper of the blank by properly adjusting the stops 55 and 56 and by properly inclining the taper bar 58. If the blank is irregular in outline, it will be necessary to substitute for the straight taper bar 58 another suitable bar having its upper surface formed with the same outline as the outline of the blank.

So far as described up to the present point, it has been assumed that the grooves to be cut by the cutter are to be parallel with the axis of the blank. It is frequently desired, however, to cut either right-hand or left-hand helical grooves. In order that such grooves may be cut, I provide means for turning the spindle 4 during the longitudinal movement of the table and thus turning the blank. Mounted on the spindle 4 and connected therewith by means to be presently fully described, is a gear wheel 62 provided with two oppositely disposed sets of bevel teeth. Mounted on the table 2 is a bearing bracket 63. In this bracket are mounted two transverse horizontal shafts 64 and 65 respectively carrying bevel gears 66 and 67 which mesh with the teeth of the gear 62. The shaft 64 carries a spur gear 68 and the shaft 65 carries a spur gear 69, these two gears being similar to each other but being placed at different positions on their respective shafts. Also mounted in the bracket 63 is a shaft 70 and splined on the shaft is a gear wheel 71 adapted to mesh either with the gear wheel 68 or with the gear wheel 69. The hub of the gear wheel 71 is provided with a groove in which fits an arm 72. This arm is guided by a transverse horizontal rod 73 and carries a spring-pressed pin 74 which is adapted to enter one or the other of two apertures 75 formed in the bracket 63. By means of this construction the gear wheel 71 can be engaged either with the gear wheel 68 or with the gear wheel 69 and can be locked in one position or the other as required.

Mounted in a suitable bearing aperture in the table 2 is a transverse shaft 76 which is parallel with the shaft 70. This shaft 76 carries a spur gear 77 which meshes with a rack 78 carried by the main frame 1, the lower part of the table 2 being cut away to provide room for the rack, as shown. The shaft 76 carries a spur gear 79 and the shaft 70 carries a spur gear 80. Interposed between these gears 79 and 80 is an idler gear 81. This idler gear is mounted on a stud 82 which is adjustable in a slot 83 formed in an arm 84. The arm 84 pivotally engages a hub formed on the bracket 63 concentrically with the shaft 70, and a screw 85 is provided for clamping the arm to the hub. It will be seen that, by means of the construction described, the shaft 76 will be rotated whenever the table 2 is moved, and this rotative movement will be transmitted to the shaft 70 and from it to one or the other of the shafts 64 and 65, dependent upon the position of the gear 71. From the shaft 64 or 65, as the case may be, motion is transmitted to the gear 62, and thus the spindle 4 and the blank are rotated in one direction or the other as required. By changing the position of the arm 72 and thus of the gear 71, the direction of rotation of the blank can be changed and the machine thus adapted for cutting right-hand helices or left-hand helices as required.

In order to insure the cutting of helices of the desired pitch, it is necessary to properly regulate the amount of rotative movement of the spindle and blank in proportion to the extent of longitudinal movement of the table. This I accomplish by providing a series of differently diametered gears which can be substituted for the gears 79 and 80 illustrated. By properly adjusting the stud 82 longitudinally of the slot, and by properly adjusting the arm 84 angularly, the idler gear 82 can be adjusted to properly mesh with whatever gears may have been substituted for the present gears 79 and 80.

When helical grooves are to be cut, it is necessary to adjust the cutter 19 angularly so that its cutting plane may be parallel with the groove at the point of cutting. I have already stated that the cutter is carried by the bracket 28, and I will now describe in detail the other parts by means of which it is so carried. Rigidly secured to the bracket 28 is a frame or bed plate 86, and movably mounted thereon is a swivel plate 87. This swivel plate is provided with front and rear edge portions which are circularly curved, having a common center which lies in the vertical plane of the common axis of the centers 9 and 10. The swivel plate is engaged and held in place by guides or clips 88 and 89 which are similarly curved. The bed 86 is provided with two T-slots 90 and 91 and T-bolts 92 and 93 extend through the swivel plate and respectively enter the T-slots. It will be seen that the construction described permits the swivel plate 87 to be adjusted angularly about a vertical axis $c$—$c$ lying in the vertical plane of the common axis of the centers 9 and 10. After adjustment the swivel plate may be locked in place by means of the bolts 92 and 93.

Transversely adjustable in suitable guides formed in the swivel plate 87 is a slide 94. This slide is movable under the control of a screw 95. By means of a gib 96 and screws 97 the slide can be locked in adjusted position. Rotatably mounted in suitable bearing apertures in the slide 94 is a spindle 98 which is adapted to carry a mandrel 99 upon which the cutter 19 is mounted. The spindle is mounted in fixed relation to the horizontal top plane of the bracket 28, and hence the spindle and the cutter remain in fixed relation to the horizontal as they are moved upward or downward in the way before described.

The cutter 19 has two sets of cutting edges $19^a$ and $19^b$ which are at angles to each other so as to be adapted to cut grooves of the required shape in a blank such as A. When the blank is for a milling cutter, each groove has one side radial or approximately so, in order to provide the required cutting faces. When the grooves are helical the radial faces are warped, conforming to helicoids. For cutting grooves with such helicoidal cutting faces it is preferable to have the edges $19^a$ of the cutter inclined with respect to the axis thereof so as to generate a conical surface as the cutter rotates. This conical surface can have line tangency with the required warped helicoidal surfaces. If the cutting edges of the cutter were perpendicular to the axis thereof, they would generate a plane surface which would intersect the desired warped helicoidal surface and which could not have line tangency therewith. With the cutting edges so arranged it would be impossible to cut accurate helicoids.

The cutting edges $19^a$ of the cutter when at the cutting position must conform, or approximately conform, to radial lines intersecting the axis of the blank. The cutter must be adjusted, in accordance with the diameter of the blank to be cut, and in the case of a tapered blank must be adjusted during the cutting of the single groove. Obviously this adjustment should take place in a direction parallel with the radial lines, in order that the cutter may maintain its proper relationship with the required helicoidal surfaces. When the cutter is arranged for vertical adjustment, as shown in the drawings, the said radial lines are arranged vertically, as shown. In order for the radial lines to be vertical, the axis of the cutter must be inclined. The spindle 98 is therefore positioned at an inclination, and as shown it extends upward toward the rear. The angle of inclination, as illustrated, is about 15°, but this may be varied in accordance with the circumstances.

Preferably, for supporting the outer end of the mandrel there is provided an elbow bar 100 which carries a center 101 adapted to engage the end of the mandrel. The bar 100 is inclined in accordance with the inclination of the spindle 98 and is adjustable to accommodate mandrels of different lengths. The bar can be clamped in adjusted position by means of screws 102, 102. It will be seen that by adjusting the slide 94 by means of the screw 95 the cutter may be moved transversely of the blank to establish the proper coöperative relationship. Inasmuch as the slide 94 is mounted on the swivel plate 87 the adjustment of the slide in no way affect the axis $c$—$c$ about which the cutter is angularly adjustable horizontally.

Preferably, for moving the swivel plate 87 angularly, a worm wheel segment 103 is secured to the under side of the plate. The bed 86 is provided with an arcuate groove 104 adapted to receive the segment. This segment meshes with a worm 105 carried by a longitudinal shaft 106 mounted in the bed plate 86. The shaft 106 is provided with a squared end whereby it may be manually turned to adjust the swivel plate angularly.

I have already shown that the machine can be adjusted for cutting grooves in tapered or irregular blanks and that the machine can be used for cutting helical grooves. It will be appreciated, however, that difficulties would ordinarily be encountered in attempting to cut helical grooves in tapered or irregular blanks. When helical grooves are to be cut in tapered or irregular blanks, the manner of cutting must be varied in accordance with variations in the diameter; that is, either the longitudinal pitch of the grooves or the angle of inclination thereof must be varied in accordance with variations in the diameter. I find it preferable to maintain the longitudinal pitch constant, and I therefore provide means whereby the pitch angle may be changed as the diameter of the blank varies. In order to maintain the cutter in tangency with the radial helicoidal side of the groove at the point of cutting I provide mechanism whereby the horizontal angle of the cutter is automatically made to vary in accordance with variations in the diameter of the blank. It has already been pointed out that this angular adjustment takes place about the axis $c$—$c$, this axis preferably intersecting the blank axis. It will be observed that the axis $c$—$c$ is at the same angle to the cutter axis as are the cutting edges 19ª. It therefore follows that the axis c—c is parallel with the direction of bodily adjustment of the cutter, this direction in the present instance being vertical.

Secured to the main frame is a vertical rack 107 which meshes with a gear 108 rotatably mounted on a stud carried by the bracket 28. The gear 108 meshes with a gear 109 which is mounted on a shaft 110, which shaft is rotatable in a suitable bearing bracket 111 carried by the bracket 28 and has secured to its other end a gear wheel 112. An arm 113 is pivotally mounted concentrically with the shaft 110 and carries two gears 114 and 115 which are mounted on studs adjustable in slots formed longitudinally of the arm. The gear 114 meshes with the gear 112 and also with the gear 115. The gear 115 meshes with a gear 116 which is mounted on a stud on the bed 86 and which also meshes with a gear 117 on the shaft 106. The arm 113 can be locked in adjusted position by means of a clamping screw 118. It will be observed that by means of the train of gearing which has been described the shaft 106 with the worm 105 will be rotated whenever the bracket 28 with the associated parts is raised or lowered. Assuming the bolts 92 and 93 to be loose, the rotation of the worm 105 causes the swivel plate 87 to move and change the angle of the cutter 10. The gearing is so proportioned that the angle is changed at approximately the rate which is necessary in accordance with the variation in the diameter of the blank as represented by the vertical movement of the cutter. For left-hand helices the cutter must be turned in one direction, and for right-hand helices it must be turned in the other direction. In order to reverse the direction of rotation from that shown, the idler gear 114 is removed and the gear 115 is so adjusted as to mesh not only with the gear 116 but also with the gear 112.

The rate at which the angle of the cutter must be changed depends upon the pitch of the helices, and the required rate of change is less for large pitches than for small pitches. In order that the rate of change may be varied in accordance with the pitch, I provide a series of gears any one of which can be substituted for the gear 112. In this way the rate of turning of the swivel plate 87 and of the cutter may be varied as required.

It will be recalled that automatic means are provided for raising the cutter out of engagement with the blank for the return stroke and for restoring it to normal position for the forward stroke. Because of the gearing connection that has been described, this supplemental raising and lowering of the cutter and of the parts which carry it would tend to supplementally swing the cutter angularly. In many cases it is desirable to vertically lift the cutter from the finished grooves or to vertically lower the cutter to start the grooves. In such cases this supplemental swinging movement of the cutter, taking place after the end of or before the beginning of the normal longitudinal and turning movement of the blank, would cause the cutter to mutilate the desired radial helicoidal sides of the grooves.

To prevent such supplemental swinging of the cutter I provide two stops 119 and 120 which are adapted to be held in place by T-bolts respectively entering the T-slots 90 and 91. It will be seen that by means of these stops the angular movement of the swivel plate and of the cutter in either direction can be definitely limited. In practice, one or the other of these stops is so located as to engage the swivel plate at the instant when the table 2 reaches the end of its forward stroke. The engagement of the swivel plate with the stop prevents any supplemental swinging movement of the cutter as it is withdrawn from the groove.

In order that the movement of the swivel plate may be stopped at the end of the forward stroke of the table, as just described, there is provided a suitable friction connection in the gearing. As illustrated, the gear 109 is connected with the shaft 110 indirectly through suitable friction disks 121 which are pressed together by springs 122. When the swivel plate is engaged by the limiting stop, slipping takes place at the friction disks.

One of the stops 119 and 120 is adjusted as before stated to limit the swinging movement of the cutter at the end of the forward stroke of the table. In order that the cutter may always be returned to the same angular position for starting the cutting of the successive grooves, the other stop is adjusted to be engaged by the swivel plate at the end of the backward stroke of the table.

I provide a driving mechanism for the cutter spindle 98 which is operative at all times notwithstanding the several possible adjustments and movements of the spindle and associated parts. The spindle 98 carries a spiral gear 123 which meshes with a spiral gear 124 on a vertical shaft 125. This shaft is rotatably mounted at its lower end in a bearing 126 formed in a yoke 127. For supporting the upper end of the shaft 125 there is provided a supplemental bearing 128 formed in a bracket 129 which extends upward from the swivel plate 87. The yoke 127 is provided with a hub concentric with the shaft 125, this hub being pivoted in a suitable aperture in the swivel plate 87. The yoke 127 is also provided with a bearing 130 having its aperture at right angles to the aperture 126. Mounted in this bearing 130 is a horizontal rotatable shaft 131, and secured respectively to the shafts 125 and 131 are meshing bevel gears 132 and 133.

Projecting from the left-hand side of the bed 86 as viewed in Fig. 3, is a bearing bracket 134. 135 is a yoke provided with a hub 136 which is vertically pivoted in an aperture in the bracket 134. The yoke 135 is also provided with a bearing 137 in which is rotatably mounted a sleeve 138. The aforesaid shaft 131 extends through the central aperture of the sleeve and has a splined connection therewith. The aforesaid hub 136 is provided with a central aperture through which extends a vertical shaft 139. Mounted respectively on the shaft 139 and the sleeve 138 are meshing bevel gears 140 and 141.

It will be seen that when the shaft 139 is rotated the rotative movement will be transmitted to the shaft 131. Inasmuch as the shaft 131 has splined engagement with the sleeve 138 and inasmuch as the shaft is supported at each end by a pivoted yoke, the swivel plate 87 can be freely moved in either direction without interfering with the power connection to the shaft 131. The gear 123 is sufficiently wide to permit longitudinal movement of the slide 94 without disengaging the gear 123 from the gear 124.

Mounted in suitable bearings on the frame 1 is a main drive shaft 142, this being provided with suitable driving means such as cone pulleys 143. Mounted on the main drive shaft 142 is a spiral gear 144 which meshes with a spiral gear 145 formed on a vertical rotatable sleeve 146. The sleeve 146 is rotatably mounted in a bearing bracket secured to the main frame. The aforesaid vertical shaft 139 extends through the sleeve 146 and has splined engagement therewith. By means of the connection described, the shaft 139 and the parts connected therewith are continuously rotated whenever the main drive shaft 142 is rotated. The splined connection between the shaft 139 and the sleeve 146 permits the shaft 139 to be freely raised or lowered with the bed 86 and associated parts without interfering with the power connection.

In order that a series of grooves may be cut in a blank and in order that these grooves may be properly spaced, I provide a suitable indexing mechanism whereby the blank may be turned through a predetermined angle after each cutting operation. The indexing mechanism is preferably automatic and will now be described. Mounted on the spindle 4 is a worm wheel 147 which meshes with a worm 148 on a short transverse shaft 149 carried by the headstock. By means of power applied to the shaft 149 in the manner to be described, indexing is effected. It will be clear, however, that in order to effect indexing, the gear 62 and the parts associated therewith must be disconnected from the spindle; and similarly, it will be clear that, in order to turn the spindle during cutting in the way that has been described, the worm wheel 147 must be disconnected from the spindle. In order to alternately make and break the connection between each of these parts and the spindle, I provide a two-part clutch. The worm wheel 147 is rotatable on the spindle and is provided with an annular flange 150. The gear wheel 62 is also rotatable on the spindle and is connected with an annular flange 151. Respectively positioned within the flanges 150 and 151 are metallic expansion rings 152 and 153, held in place by a sleeve 154. Slidable on the sleeve 154 is a grooved collar 159 which carries wedges 155 and 156. As shown clearly in Fig. 11, these wedges are adapted respectively to coöperate with pairs of rocker levers 157 and 158 to expand the rings 152 and 153. When the collar is in central position, as shown, both of the rings are expanded and forced into engagement respectively with the flanges 150 and 151. Thus the worm wheel 147 and the gear 62 are both locked to the spindle. When the collar is moved toward the right, as viewed in Fig. 11, the gear 62 is released from the spindle, and when the collar is moved toward the left the worm wheel 147 is released from the spindle.

A forked lever 160 is connected to a transverse rock shaft 161 mounted on the table 2. The lever is provided with pins which enter the groove of the collar 159. At the front end of the shaft 161 is secured an arm 162 which is provided at its lower end with spiral gear teeth 163. Mounted in suitable bearing brackets at the front end of the main frame is a longitudinal shaft 164 and splined on this shaft is a spiral gear 165. The gear 165 meshes with the teeth 163 on the arm 162 and the gear is positioned between brackets which depend from the table 2 so that the gear is made to travel along the shaft when the table moves. It will be seen that by turning the shaft 164 the arm 162 may be made to turn in one direction or the other as required, thus moving the collar 159 in one direction or the other and releasing either the worm wheel 147 or the gear 62 from the spindle 4. For turning the shaft 164 manually there is provided a handle 166 at the right-hand end of the shaft, as viewed in Fig. 1. At the other end of the shaft is secured a gear wheel 167 which meshes with gear teeth 168 formed on a pivoted arm 169. The arm 169 is pivoted between its ends to the main frame at 170. At its lower end, the arm 169 carries a roller 171 adapted to be engaged by cam members 172 and 173 carried by a cam disk 174 mounted on the shaft 22.

Rotatably mounted in suitable bearing brackets at the front of the main frame is a longitudinal shaft 175. Splined on this shaft is a spiral gear 176 which is positioned between brackets depending from the table 2 so that the gear is made to move along the shaft as the table moves. The spiral gear 176 meshes with a spiral gear 177 on a short transverse shaft 178 carried by the table 2. The shaft 149 carries a gear 179 and the shaft 178 carries a gear 180. Meshing with the said gears 179 and 180 is an idler gear 181 which is mounted on a stud adjustable longitudinally with a slot in an arm 182. This arm is movable about the axis of the shaft 149 and can be clamped in adjusted position by means of a screw 183. It will be seen that through the gearing described the worm wheel 147, together with the spindle 4 and the blank, may be turned whenever the shaft 175 is turned.

Mounted on the shaft 175 at its right-hand end is a spiral gear 184. This gear is rotatable on the shaft and is connected therewith by means of friction disks 185 which are pressed together by means of springs 186. The gear 184 meshes with a spiral gear 187 on a vertical shaft 188 which is continuously rotatable, as will be presently described.

Secured to the shaft 175 is a rotatable collar 189 provided with an outward projecting lug 190. Pivotally mounted below the shaft 175 is a lever 191 having a hook portion adapted to engage the lug 190. The lever is normally held in engagement with the lug by means of a spring 192. The engagement of the lug 190 by the lever 191 prevents the shaft 175 from rotating, notwithstanding the continuous rotation of the gear 184. Mounted upon the aforesaid cam disk 174 is a cam member 193 adapted to engage a lug 194 on the lever 191. When the lug is thus engaged the lever is swung so that the lug 190 is disengaged, thus permitting the shaft 75 to be turned by the gear 184 acting through the friction disks 185. By the time the shaft 175 has made a complete revolution, the cam member 193 has disengaged the lug 194, thus permitting the lever 191 to again engage the lug 190. In this way the shaft 175 is caused to make a single revolution at each revolution of the cam disk 174.

The gearing between the shaft 175 and the worm wheel 147 is so proportioned that for each revolution of the shaft 175 the worm wheel is turned through an angle corresponding to the desired angle between two successive grooves in the blank. In order that this angle may be changed as desired I provide a series of differently diametered gears which can be substituted for either or both of the gears 179 and 180. By using gears of the proper diameters the worm wheel 147 can be turned through any desired angle.

For turning the main cam shaft 22 and for turning the vertical shaft 188, I provide a transverse horizontal intermediate drive shaft 195. This shaft carries a worm 196 which meshes with a worm wheel 197 secured to the cam shaft 22. The shaft 195 also carries a spiral gear 198 which meshes with a spiral gear 199 secured to the shaft 188 near the bottom thereof. The front end of the shaft 195 is preferably squared to receive a wrench so that the shaft can be turned manually when required. Normally, however, the shaft is driven by power.

Mounted in alinement with the shaft 195 is a short shaft 200 carrying a spiral gear 201. The gear 201 meshes with a gear 202 on a shaft 203. This shaft 203 is driven from the main drive shaft 142 by means of a belt which passes over cone pulleys 204 and 205.

Loosely mounted on the shaft 195 is a sleeve carrying a worm wheel 206 which meshes with a worm 207. The worm 207 is mounted on a short longitudinal shaft 208 which is driven from the shaft 203 by means of spur gears 209, 210 and 211.

Splined on the shaft 195 between the gear wheel 201 and the worm wheel 206 is a clutch collar 212 provided at its opposite sides with teeth adapted respectively to mesh with similar teeth formed on the wheels 201 and 206. When the clutch collar is in central position as shown in Fig. 6, the shaft 195 is idle. When the clutch collar is moved to the right the shaft is connected with the relatively rapidly rotating spiral gear wheel 201 and when the clutch collar is moved to the left the shaft is connected to the relatively slowly moving worm wheel 206.

The clutch collar 212 is movable under the control of a forked lever 213 which is pivoted for movement about a vertical axis and which has connected with it an arm 214 carrying a roller 215. Pivotally mounted adjacent the arm 214 and the roller 215 is a bell-crank lever 216, one arm of which is adapted to coöperate with the arm 214 to move it in one direction or the other. The other arm of the bell-crank lever is adapted to be engaged by shipper dogs 217 and 218 carried by a disk 219 on the cam shaft 22. As the cam shaft 22 is rotated, the shipper dogs 217 and 218 successively engage the bell-crank lever 216, thus moving the arm 214 and through it the clutch collar 212 alternately toward the right and toward the left. In this way the shaft 195 is alternately connected to be driven at high speed by the spiral gear wheel 201 and at low speed by the worm wheel 206.

In order that the clutch collar 212 may be moved to its neutral position manually to stop the machine, a link 220 is connected to the arm 214. Pivoted to the forward end of the link is an arm 221 having a fixed pivot at 222. Pivoted to the arm 221 for movement about an axis parallel to the axis of the link is a handle 223. When the handle is in its left-hand position the link 220 is free to move longitudinally when the arm 214 is moved by the bell-crank lever 216. However, when the handle is moved to its right-hand position, as illustrated in Figs. 1 and 2, it enters a V-shaped notch in a bracket 224, thus maintaining the link 220 and the parts connected therewith in a central neutral position. In this way the rotation of the shaft 195 is stopped and the entire machine is stopped with the exception of the cutter, which continues to rotate. To start the operation again the handle may be swung to the left and the link moved longitudinally, preferably toward the front, thus connecting the shaft 195 with the worm wheel 206.

The shipper dog 217 is so positioned on the disk 219 that it swings the bell-crank lever 216 in the counterclockwise direction and thus connects the shaft 195 with the worm wheel 206 at the beginning of the forward or cutting stroke of the table 2. This causes the shaft 22 to be rotated relatively slowly, and causes the table to be moved forward relatively slowly for the cutting stroke. At the end of the forward movement of the table the shipper dog 218 engages the bell-crank lever to move it in the clockwise direction and thus connect the shaft 195 with the gear 201. In this way the shaft 22 and the shaft 188 are made to rotate relatively rapidly and the table is caused to have a relatively rapid backward or return movement. The cam disk 174 with the cam members thereon is so located relatively that the indexing takes place during the period when the table is stationary at the end of the backward movebent thereof and while the shaft 188 is still rotating rapidly.

I provide means for automatically stopping the machine after a blank has been completely grooved. Formed on the flanged part of the worm wheel 147 is a cam projection 225 adapted to engage an arm 226 on a short rock shaft 227. By means of a spring, the arm 226 is normally held against the flange of the worm wheel. At the other end of the rock shaft 227 is an arm 228 which has a loose pivotal connection with an arm 229 on a rock shaft 230 carried in suitable bearings on the table 2 and on the main frame 1. It will be seen that when the cam projection 225 engages the arm 226 the shaft 230 is turned in the clockwise direction, as viewed in Fig. 6. Carried by the main frame of the machine is a hook member 231 which is adapted to be engaged by a ring 232 at the lower end of a cord 233 which extends to a suitable device for starting and stopping the transmission of power. This device constitutes no part of the present invention and is not shown, but for convenience it can be understood to be a belt shifted controlled by a weight or a spring. When the cord is in its lower position with the ring engaged by the hook as shown in Figs. 5 and 6, power is being transmitted. When the ring is disengaged from the hook the cord is permitted to move upward, thus stopping the transmission of power. Mounted on the rock shaft 230 is a carrier block 234. This block is adjustable along the shaft and can be held in adjusted position by means of a set screw. Pivoted to the block 234 is a spring-pressed dog 235. The block 234 is so positioned on the rock shaft that it is opposite the hook 231 when the table is in its rearmost position as shown in Fig. 2.

When the worm wheel 147 has been indexed through a complete revolution the cam projection 225 swings the lever 226 to the position shown in Fig. 6, thus swinging the rock shaft 230 in the clockwise direction. Inasmuch as the dog 235 is opposite the hook 231, the dog engages the ring 232 and yields against the action of the spring, taking the position shown in Fig. 6. The operation of the machine continues and the cutter proceeds to cut the last groove in the blank. As the table moves forward the dog 235 is carried past the ring and moves outward under the influence of the spring. On the following return movement the dog 235, being now in its outer position, engages the ring 232 and pushes it off from the hook 231, thus stopping the machine at the end of the backward stroke. When the operator has taken out the finished blank and put a new one in place, he again starts the machine by pulling on the cord 233. The first operation of the machine is indexing, the worm wheel 147 being turned to a position such that the cam projection 225 disengages the lever 226, permitting the dog 235 to swing away from the hook 231 so that the ring 232 may be freely slipped into place.

In operation, a blank to be grooved is first mounted on the centers 9 and 10 in the usual way and is connected to the spindle 4 to be driven thereby. The operator then adjusts the dogs 26 and 27 so that the table is reciprocated to carry the part of the blank to be grooved past the cutter. If the blank is a cylindrical one the dogs 55 and 56 are either removed or so positioned as not to reciprocate the slide 52. However, if the blank is a tapered one, the taper bar 58 is adjusted at an angle corresponding to the taper of the blank and the dogs 55 and 56 are so adjusted that the slide 52 is reciprocated in synchronism with the table. If the blank is irregular in any way the taper bar 58 is removed and another bar is submitted having a top surface corresponding to the outline of the blank. If it is desired to cut grooves parallel to the axis of the blank, the arm 84 is swung to disconnect the gears 81 and 79, thus permitting the spindle to travel with the carriage without rotative movement. The spindle is suitably locked against accidental rotative movement during cutting, preferably by locking the gear wheel 62. If helical grooves are to be cut, the gears 81 and 79 are brought into mesh after first selecting and putting in place gears of the proper diameters to give the required rotative movement to the spindle. By means of the arm 72 and the gear 71, the helices can be made right-hand or left-hand as required.

If either straight or helical grooves are to be cut in a cylindrical blank, or if straight grooves are to be cut in a tapered or irregular blank, the arm 113 is swung to disengage the gear 115 from the gear 116. However, if helical grooves are to be cut in a tapered or irregular blank, the arm is swung to engage the gears 115 and 116, the operator having first selected the proper gear 112 to give the rate of cutter movement which is required. As already stated, the cutter must be moved more rapidly for helices with small pitches than for helices with larger pitches. Assuming that right-hand helices are to be cut and that the diameter of the blank increases from right to left, the operator so positions the stop 120 as to stop the movement of the swivel plate 87 in the clockwise direction at the end of the forward movement of the table toward the right; and he so positions the stop 119 as to stop the movement of the swivel plate in the counter-clockwise direction at or near the end of the backward movement of the table toward the left. In this way angular movement of the cutter is prevented during the supplemental raising and lowering movements of the cutter at the end and the beginning of each cutting stroke; and, furthermore, the stops serve to cause the cutter to have the same angular position at the beginning of each cutting stroke notwithstanding the slipping which may have previously taken place at the friction disks.

Next, with the lever 43 swung to the right so that the block 35 and connected parts are carried by the rods 49, the operator, by means of the screw 29, adjusts the bracket 28 and the cutter vertically so as to form cuts of the required depth.

The indexing mechanism is adjusted for securing the proper spacing of the grooves by selecting gears 179 and 180 of proper diameters.

The block 234 is adjusted on the rock shaft 230 so as to lie opposite the hook 231 when the table is in its rearmost position.

Having made the preliminary adjustments already described, the operator starts the machine by pulling on the cord 233 and engaging the ring 232 with the hook 231. Assuming the cam drum 23 to be in the position shown in Figs. 1 and 3, which is the normal stopping position, the table is first held stationary for a brief period, and while it is so held the cam member 172 engages the roller 171 on the lever 169 and, by means of the mechanism which has been described, serves to move the clutch sleeve 154 toward the right as viewed in Figs. 1, 2 and 11. This movement of the clutch sleeve serves to disconnect the gear wheel 62 from the spindle 4 and to connect the worm wheel 147 with the spindle. It will be remembered, however, that the worm wheel is connected with the spindle before the gear wheel is disconnected, thus making it impossible for any free movement of the spindle to take place. As soon as the worm wheel is connected with the spindle, the cam member 193 moves the lever 191 to release the shaft 175 and permit it to turn through one revolution under the influence of the gear wheel 184. In this way the spindle 4 with the blank is indexed through the required angle to place the blank in position for the next cut. As soon as the indexing is complete the cam element 173 engages the roller 171 to move the lever 169 in the other direction and to move the clutch sleeve in the other direction. This movement disconnects the worm wheel 147 from the sleeve and connects the gear wheel 62 therewith. It will be understood that here also the connection with the gear wheel is complete before the connection with the worm wheel is broken, thus preventing any free movement of the spindle.

When the spindle is again connected with the gear wheel 62, the cam element 47 moves the lever 43 toward the right, thus turning the shaft 35 and restoring the bracket 28 and the cutter to their lowermost positions as determined by the limit rods 49. The indexing and other operations have taken place with the cam shaft 22 and other parts moving at relatively high speed, the shaft 195 being connected to the gear 201. At this point, however, the shipper dog 217 engages the bell-crank lever 216 and the shaft 195 is connected to the worm wheel 206.

The rotation of the cam 23 then causes the slide 21 to move forward, carrying with it the table 2 and the slide 52. During this forward movement, the shaft 195 and all of the parts connected therewith, including the cam drum 23, move relatively slowly; and the blank is brought into engagement with the continuously rotating cutter and a groove is cut. The blank is, or may be, turned to form a right-hand or left-hand spiral groove as already described; and the cutter may be raised or lowered during the cutting operation to conform to variations in the diameter of the blank. For spiral cutting the cutter may be swung to conform to variations in the pitch angle when the diameter varies.

At the conclusion of the forward stroke of the table the shaft 195 is disconnected from the worm wheel 206 and is connected with the spiral gear 201 by means of the shipper dog 218 which engages the bell-crank lever 216. The shaft now rotates at a relatively high speed, and the cam drum 23 acts to return the slide 21 together with the table 2 and the slide 52 to their rearmost positions. The cam member 46 on the drum 45 moves the lever 43 toward the left, thus elevating the cutter in the way that has been described. As already stated, this elevation of the cutter is effected in order to prevent any marring or supplemental cutting along the lines of the groove already cut. This is particularly necessary for spiral cutting, when, owing to lost motion or back-lash, the cutter would not follow exactly the same relative course during the backward movement. The extent to which the cutter is elevated can be varied as required by properly adjusting the cam member 46. The stops 119 and 120, when used, serve to prevent angular movement of the cutter when it is being lifted at the end of the cutting stroke or lowered at the beginning thereof.

Following the backward movement of the table indexing again takes place and the series of operations already described is repeated.

When the spindle has been indexed through a complete revolution, the cam projection 225 on the worm wheel 147 engages the lever 226 and moves the dog 235 outward to the position shown in Fig. 6. On the return movement following the completion of the next cut the dog 235 disengages the ring 232 from the hook 231, thus releasing the cord 233 and stopping the machine. The operator then removes the completely grooved blank and puts another blank in place, after which he starts the machine simply by pulling on the cord 233 and engaging the ring with the hook. The operation then continues automatically as already described until the next blank is finished.

My improved method will be more clearly understood by referring to diagrammatic Figs. 18 to 21. In these figures B is a blank for a formed or contour cutter larger at one end than at the other and having helical teeth with radial or approximately radial helicoidal front cutting faces. Fig. 18 is a plan view of the blank and shows the cutter 19 in operative relation with the larger end thereof. It will be noted that the cutter has been moved about its vertical pivotal axis $c$—$c$ to a position in conformity with the angle of inclination of the cutting faces at the larger diameter. Fig. 19 is a view similar to Fig. 18 but showing the blank B moved longitudinally so that the cutter 19 is in operative relation therewith at the smaller diameter thereof. It will be noted that the cutter 19 has been moved about the axis $c$—$c$ to a greater angle in conformity with the increased angle of inclination of the helicoidal cutting faces.

Fig. 20 is a sectional view taken along the line 20—20 of Fig. 18 and shows that the line of engagement between the cutter and the helicoidal cutting face is a radial or approximately radial line notwithstanding the angular position of the cutter. This radial line coincides or approximately coincides with the axis $c$—$c$. Fig. 21 is a sectional view taken along the line 21—21 of Fig. 19 and is similar to Fig. 20. This view shows that the line of engagement between the cutter and the helicoidal face is still radial and still coincident with the axis $c$—$c$ notwithstanding the smaller diameter of the blank and notwithstanding the changed angle of the cutter.

From the foregoing description of the machine, it will be understood that in effecting relative movement from the position shown in Figs. 18 and 20 to the position shown in Figs. 19 and 21, the relative position of the cutter is changed in accordance with the different diameters of the blank and also in conformity with the correspondingly changed angles of inclination of the helicoidal faces.

What I claim is:

1. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, and means for effecting relative adjustment between the blank and the cutter toward or from each other along lines at the aforesaid acute angle to the axis of the cutter.

2. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, means for turning the blank in proportion to the relative longitudinal movement whereby the groove is made helical, and means for effecting relative adjustment between the blank and the cutter toward or from each other along lines at the aforesaid acute angle to the axis of the cutter.

3. In a milling machine, the combination of a work table, means on the table for holding a blank to be grooved, a rotatable milling cutter adapted to engage the blank and being provided with a series of cutting edges at an acute angle to the cutter axis, means for moving the blank longitudinally to cut a groove, and means for effecting relative adjustment between the blank and the cutter toward or from each other along lines at the aforesaid acute angle to the axis of the cutter.

4. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, and means for adjusting the cutter toward or from the blank along lines at the aforesaid acute angle to the axis of the cutter.

5. In a milling machine, the combination of a work table held against vertical movement, means on the table for horizontally holding a blank to be grooved, a rotatable milling cutter adapted to engage the blank and mounted for vertical adjustment, the said cutter being provided with a series of cutting edges at an acute angle to the cutter axis and the said axis being inclined at the same angle, and means for effecting relative movement between the cutter and the table longitudinally of the blank.

6. In a milling machine, the combination of a work table held against vertical movement, means on the table for horizontally holding a blank to be grooved, a rotatable milling cutter adapted to engage the blank at the top thereof and mounted for vertical adjustment, the said cutter being provided with a series of cutting edges at an acute angle to the cutter axis and the said axis being inclined at the same angle, and means for effecting relative movement between the cutter and the table longitudinally of the blank.

7. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, and means for effecting relative angular adjustment between the blank and the cutter about an axis inclined to the cutter axis at the aforesaid acute angle.

8. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, and means for effecting relative angular adjustment between the blank and the cutter about an axis inclined to the cutter axis at the aforesaid acute angle and intersecting the blank axis.

9. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, means for turning the blank in proportion to the relative longitudinal movement whereby the groove is made helical, and means for effecting relative angular adjustment between the blank and the cutter about an axis inclined to the cutter axis at the aforesaid acute angle.

10. In a milling machine, the combination of a work table, means on the table for holding a blank to be grooved, a rotatable milling cutter adapted to engage the blank and provided with a series of cutting edges at an acute angle to the cutter axis, means for moving the blank longitudinally to cut a groove, and means for effecting relative angular adjustment between the blank and the cutter about an axis inclined to the cutter axis at the aforesaid acute angle.

11. In a milling machine, the combination of a work table, means on the table for holding a blank to be grooved, a rotatable milling cutter adapted to engage the blank and provided with a series of cutting edges at an acute angle to the cutter axis, means for effective relative movement between the cutter and the blank longitudinally of the latter to cut a groove, and means for adjusting the cutter about an axis inclined to the cutter axis at the aforesaid acute angle.

12. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, means for effecting relative adjustment between the blank and the cutter toward or from each other along lines at the aforesaid acute angle to the axis of the cutter, and means for effecting relative angular adjustment between the blank and the cutter about an axis inclined to the cutter axis at the aforesaid acute angle.

13. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, means for effecting relative adjustment between the blank and the cutter toward or from each other along lines at the aforesaid acute angle to the axis of the cutter, and means for effecting relative angular adjustment between the blank and the cutter about an axis inclined to the cutter axis at the aforesaid acute angle and intersecting the blank axis.

14. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment in accordance with the helix angle between the cutter and the blank about an axis intersecting the axis of the cutter and the axis of the blank and perpendicular to the latter, and means for effecting relative adjustment between the blank and the cutter toward or from each other along lines at the aforesaid acute angle to the axis of the cutter.

15. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for adjusting the cutter in accordance with the helix angle about an axis intersecting the axis of the cutter and the axis of the blank and perpendicular to the latter, and means for effecting relative adjustment between the blank and the cutter toward or from each other along lines at the aforesaid acute angle to the axis of the cutter.

16. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment in accordance with the helix angle between the cutter and the blank about an axis intersecting the axis of the cutter and the axis of the blank and perpendicular to the latter, and means for adjusting the cutter toward or from the blank along lines at the aforesaid acute angle to the axis of the cutter.

17. In a milling machine, the combination of a work table held against vertical movement, means on the table for holding and rotating a blank to be grooved, a rotatable milling cutter adapted to engage the blank at the top thereof and mounted for vertical adjustment, the said cutter being provided with a series of cutting edges at an acute angle to the cutter axis and the said axis being inclined at the same angle, means for effecting relative movement between the cutter and the blank longitudinally of the latter to cut a helical groove, and means for effecting relative adjustment in accordance with the helix angle between the cutter and the blank about an axis intersecting the axis of the cutter and the axis of the blank and perpendicular to the latter.

18. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment in accordance with the helix angle between the cutter and the blank about an axis intersecting the axis of the cutter and the axis of the blank and perpendicular to the latter, and means for effecting relative adjustment between the blank and the cutter toward or from each other during cutting to follow variations in the diameter of the blank, the said adjustment taking place along lines at the aforesaid acute angle to the axis of the cutter.

19. In a milling machine, the combination of a work table, means on the table for holding a blank to be grooved, a rotatable milling cutter adapted to engage the blank and provided with a series of cutting edges at an acute angle to the cutter axis, means for effecting relative movement between the cutter and the blank longitudinally of the latter to cut a groove, means for effecting relative adjustment between the blank and the cutter toward or from each other along lines at the aforesaid acute angle to the axis of the cutter, and means for effecting relative angular adjustment between the blank and the cutter about an axis inclined to the cutter axis at the aforesaid acute angle, the last two said means being connected so that their operations are interdependent.

20. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cuttter, and automatic means for supplementally varying the relationship between the cutter and the blank during cutting in accordance with variations in the diameter of the blank.

21. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for effecting a relative angular movement between the cutter and the blank during cutting in accordance with variations in the angle of inclination of the groove.

22. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cu' a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for angularly moving the cutter during cutting in accordance with variations in the angle of the inclination of the groove.

23. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for angularly moving the cutter during cutting in accordance with variations in the angle of inclination of the groove about an axis inclined to the cutter axis at the aforesaid acute angle.

24. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for angularly moving the cutter during cutting in accordance with variations in the angle of inclination of the groove about an axis inclined to the cutter axis at the aforesaid acute angle and intersecting the blank axis.

25. In a milling machine, the combination of a work table, means on the table for holding and rotating a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for angularly moving the cutter during cutting in accordance with variations in the angle of inclination of the groove, the said means being adjustable to change the rate of angular movement.

26. In a milling machine, the combination of a work table, means on the table for holding and rotating in either direction a blank to be grooved, a rotatable milling cutter adapted to engage the blank and provided with a series of cutting edges at an acute angle to the cutter axis, means for effecting relative movement between the cutter and the blank longitudinally of the latter to cut a helical groove, means for effecting relative adjustment between the blank and the cutter toward or from each other during cutting to follow variations in the diameter of the blank, the said adjustment taking place along lines at the aforesaid acute angle to the axis of the cutter, and automatic means for angularly moving the cutter in either direction during cutting in accordance with variations in the angle of inclination of the groove.

27. The herein described method of milling a cutter blank of different diameters to provide it with teeth having radial or approximately radial cutting faces, the method consisting in providing a rotating milling cutter having two sets of cutting edges of which one is inclined at an acute angle with respect to the cutter axis, placing the cutter in operative relation with the blank so that the last said cutting edges will form one of the desired cutting faces, effecting relative movement between the cutter and the blank longitudinally of the latter to cut a groove, and effecting relative movement between the cutter and the blank in accordance with the different blank diameters in a direction at the aforesaid acute angle to the cutter axis.

28. The herein described method of milling a cutter blank of different diameters to provide it with teeth having radial cutting faces, the method consisting in providing a rotating milling cutter having two sets of cutting edges of which one is inclined at an acute angle with respect to the cutter axis, placing the cutter in operative relation with the blank so that the last said cutting edges will form one of the desired radial cutting faces, effecting relative movement between the cutter and the blank longitudinally of the latter to cut a groove, and effecting relative movement between the cutter and the blank radially of the latter in accordance with the different blank diameters.

29. The herein described method of milling a cutter blank of different diameters to provide it with helical teeth having radial or approximately helicoidal cutting faces, the method consisting in providing a rotating milling cutter having two sets of cutting edges of which one is inclined at an acute angle with respect to the cutter axis, placing the cutter in operative relation with the blank so that the last said cutting edges will form one of the desired helicoidal cutting faces, effecting relative movement between the cutter and the blank longitudinally of the latter to cut a groove, turning the blank during the longitudinal movement, whereby the groove is made helical, and effecting relative movement between the cutter and the blank in accordance with the different blank diameters in a direction at the aforesaid acute angle to the cutter axis.

30. The herein described method of milling a cutter blank of different diameters to provide it with helical teeth having radial or approximately radial helicoidal cutting faces, the method consisting in providing a rotating milling cutter having two sets of cutting edges of which one is inclined a an acute angle with respect to the cutter axis, placing the cutter in operative relation with the blank so that the last said cutting edges will form one of the desired radial helicoidal cutting faces, effecting relative movement between the cutter and the blank longitudinally of the latter to cut a groove, turning the blank during the longitudinal movement whereby the groove is made helical, effecting relative movement between the cutter and the blank in accordance with the different blank diameters in a direction at the aforesaid acute angle to the cutter axis, and simultaneously effecting relative angular movement between the cutter and the blank in conformity with the different angles of inclination of the helicoidal cutting face at different diameters.

31. The herein described method of milling a cutter blank of different diameters to provide it with helical teeth having radial helicoidal cutting faces, the method consisting in providing a rotating milling cutter having two sets of cutting edges of which one is inclined at an acute angle with respect to the cutter axis, placing the cutter in operative relation with the blank so that the last said cutting edges will form one of the desired radial helicoidal cutting faces, effecting relative movement between the cutter and the blank longitudinally of the latter to cut a groove, turning the blank during longitudinal movement whereby the groove is made helical, effecting relative movement between the cutter and the blank radially of the latter in accordance with the different blank diameters, and simultaneously effecting relative angular movement between the cutter and the blank in conformity with the different angles of inclination of the helicoidal cutting face at different diameters.

32. The herein described method of milling a cutter blank of different diameters to provide it with helical teeth having radial helicoidal cutting faces, the method consisting in providing a rotating milling cutter having two sets of cutting edges of which one is inclined at an acute angle with respect to the cutter axis, placing the cutter in operative relation with the blank so that the last said cutting edges will form one of the desired radial helicoidal cutting faces, effecting relative movement between the cutter and the blank longitudinally of the latter to cut a groove, turning the blank during longitudinal movement whereby the groove is made helical, effecting relative movement between the cutter and the blank radially of the latter in accordance with the different blank diameters, and simultaneously effecting relative angular movement between the cutter and the blank about an axis intersecting the axis of the cutter and the axis of the blank and perpendicular to the latter, the said angular movement being in conformity with the different angles of inclination of the helicoidal cutting face at different diameters.

In testimony whereof I hereto affix my signature.

FRIEDERICH MÜLLER.